Figure 1:
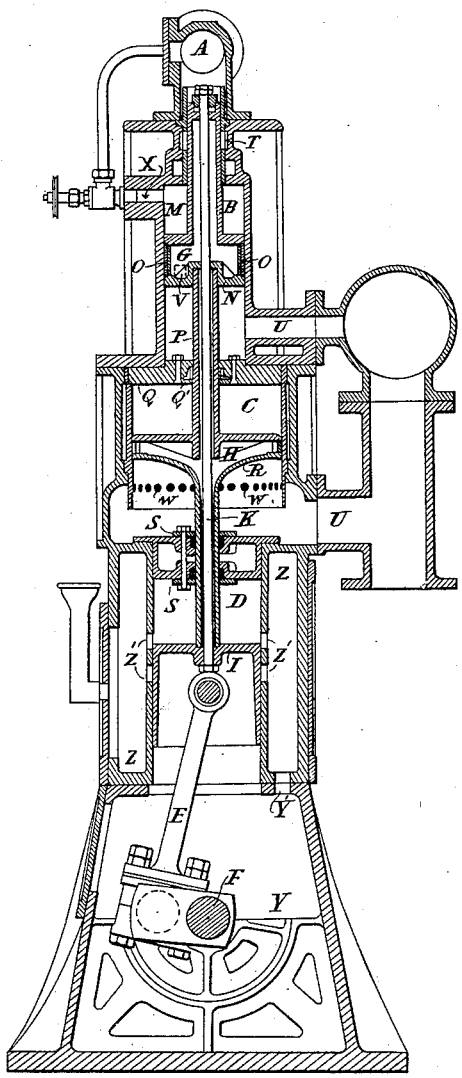

(No Model.) P. W. WILLANS. 3 Sheets—Sheet 1.
MOTIVE POWER ENGINE.

No. 338,378. Patented Mar. 23, 1886.

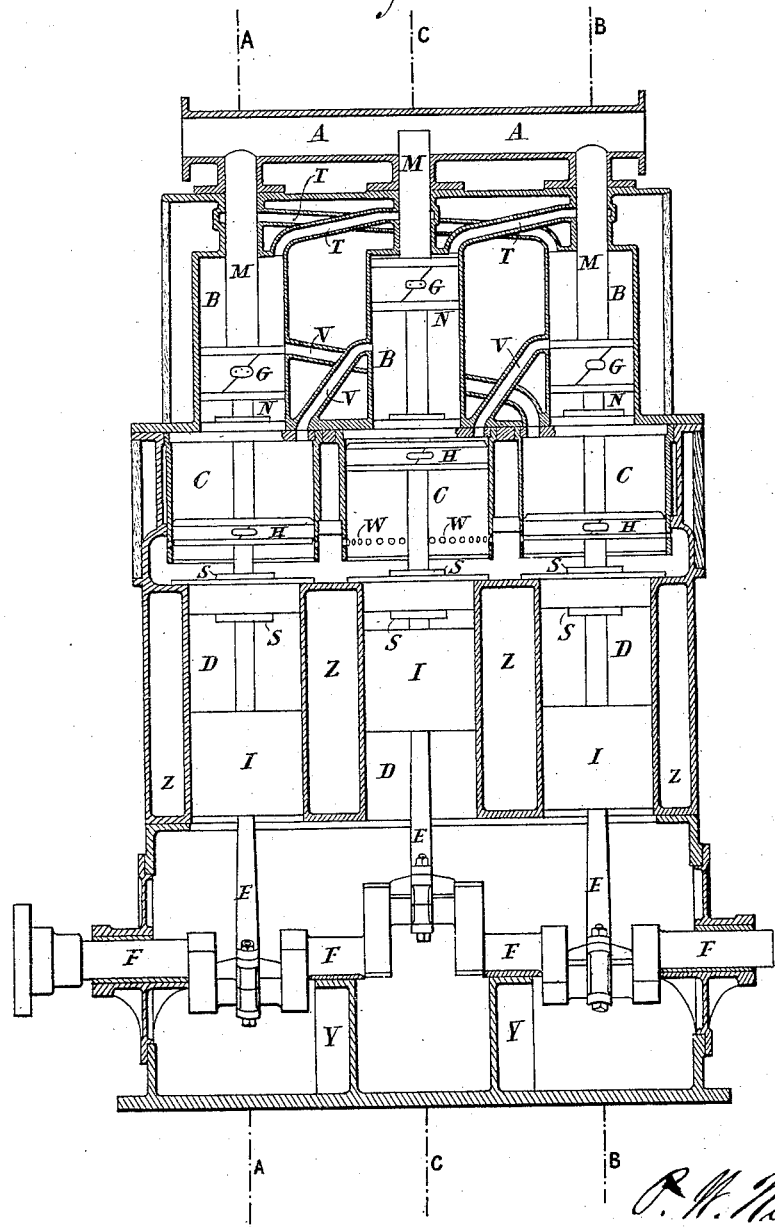

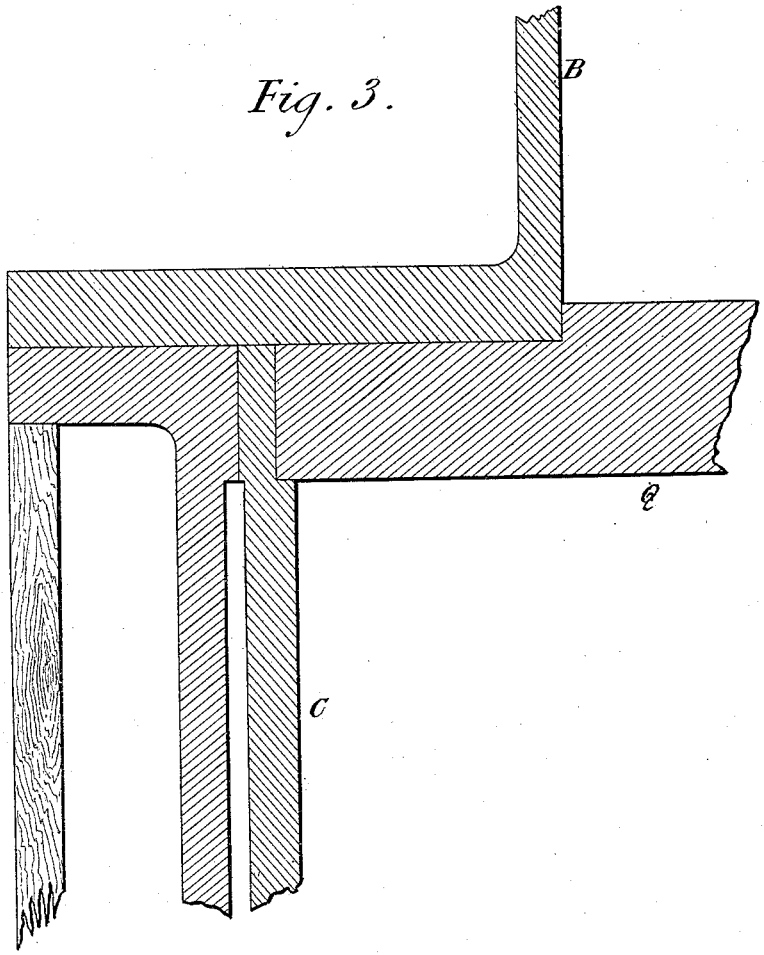

UNITED STATES PATENT OFFICE.

PETER WILLIAM WILLANS, OF THAMES DITTON, COUNTY OF SURREY, ENGLAND.

MOTIVE-POWER ENGINE.

SPECIFICATION forming part of Letters Patent No. 338,378, dated March 23, 1886.

Application filed February 24, 1885. Serial No. 156,738. (No model.) Patented in England April 16, 1880, No. 1,572.

*To all whom it may concern:*

Be it known that I, PETER WILLIAM WILLANS, a subject of the Queen of Great Britain, residing at Thames Ditton, in the county of Surrey, England, engineer, have invented certain new and useful Improvements in Motive-Power Engines to be Worked by Steam or other Aeriform Fluid, (for which I have received Letters Patent in Great Britain, No. 1,572, dated April 16, 1880,) of which the following is a specification.

This invention has for its object improvements in motive-power engines to be worked by steam or other aeriform fluid. I arrange three single-acting cylinders side by side, usually in an inverted position. Over these cylinders I set three other and smaller cylinders. The lower ends of these are connected with an exhaust-chamber. All the cylinders are provided with pistons. There are three piston-rods, each carrying a large and a small piston. The pistons working in the larger cylinders are coupled by connecting-rods with cranks on a crank-shaft. These cranks are set at angles of one hundred and twenty degrees apart. The piston-rods extend beyond the upper pistons, and at the top of the smaller cylinders they enter and work through guide tubes or sleeves which fit them steam-tight. At the top of all there is a chamber, to which the boiler-steam is admitted. The upper ends of the guide tubes or sleeves are open to the steam-chamber, and the piston-rods in working through them act as valves. When the piston-rod descends so far as to uncover a passage leading to the top of one of the small cylinders, steam passes by this passage to the cylinder. Similarly, as the piston-rod rises, it cuts off the steam from this cylinder. There are apertures or ports in the sides of the small cylinders. Each is connected by a passage with the top of one of the larger cylinders. Thus there are three sets of parts, and calling these sets "one," "two," and "three," respectively, the routine in working is as follows: The upper end of piston-rod one serves as a valve to admit steam upon the top of small piston two, and this piston in turn, after traveling a certain distance, allows the same steam to expand onto the top of large piston three. At the end of the downward stroke of large piston three the small piston two, which is now rising, passes over the port in the side of its cylinder, and leaves a free passage from large cylinder three into the lower part of small cylinder two, which is in permanent communication with the exhaust-chamber. Similarly the course of the steam may be traced, commencing with piston-rod two acting as a valve and admitting steam to small cylinder three, which afterward expands in large cylinder one, or, commencing with piston-rod three, admitting steam to small cylinder one, which afterward expands in large cylinder two. The engine works in the manner described while working expansively; but when full power is required a stop-cock is opened, which admits the boiler-steam continuously to the upper parts of the small cylinders. The engine can be reversed by means of a multiple cock, which transposes the passages, so that small cylinder two may discharge into large cylinder one, and not into large cylinder three, as previously described, and similarly in each case. The engine is also provided with air-buffers to check the momentum of the parts in the upward stroke. These, however, form the subject of another patent application. The pistons are so constructed that the steam-pressure serves to hold the top and bottom plate of the piston in contact with the piston-rings, and so close joints are maintained, and any wear which may take place endwise in the piston-rings is automatically compensated. The arrangement is similar in respect to packing the piston-rods. The metallic ring-packings which embrace the rod are held between surfaces of which one is movable and able to yield to the steam or fluid pressure.

In the accompanying drawings, Figure 1 represents a vertical section of an engine constructed in accordance with my invention. The section is taken transversely and on the line A A of Fig. 2 centrally through one of the three sets of parts or elements of which the engine is composed, and as the other two elements are in all respects similar, sections on the lines B B and C C would differ only as to the position of parts. Fig. 2 is a vertical and longitudinal section, and Fig. 3 shows on an enlarged scale and in section details of the arrangement of the cover of a low-pressure cylinder.

A is the steam-chest at the upper part of the engine, to which steam is supplied continuously from the boiler.

As the three sets of parts or elements of the engine are alike, detailed description of one of these three elements will suffice for all.

B is the high-pressure cylinder.

C is the low-pressure-cylinder.

D is the buffer-cylinder.

E is the connecting-rod.

F is the main shaft, on which, as already stated, there are three cranks at angles of one hundred and twenty degrees. Each crank is operated by one element of the compound engine such as these drawings represent.

H is the piston in the low-pressure cylinder. G is the piston in the high-pressure cylinder. I is the buffer-piston. To the buffer-piston the connecting-rod E is directly connected in the manner which the drawings indicate. These several pistons of each element of the engine are built up of a number of parts, which are all held together by a tie-rod, K, passing through them from end to end; but they are also kept together by the pressure of the steam, which is always acting in a downward direction on the top of the hollow piston rod or ram M, which is the uppermost of the series of parts of which the system of pistons is composed. A flange at the lower end of the part M forms the upper face of the piston G, and between this and the lower face, N, of the same piston there is a pair of piston-rings, O.

P is a tube or hollow rod which supports the part N. It passes through the cover Q of the low-pressure cylinder by a gland, which is kept tight by a pair of cast-iron rings embracing the rod. These rings are lodged in a cavity in the cover, which is closed on the under side by a flexible plate, Q', which is caused by the steam-pressure to nip the packing-rings above it. The cover Q is received into a socket at the upper end of the cylinder C, and it is held in its place by the bolts which secure the upper casting, of which the cylinder B forms a part. A flange at the lower part of the tube P forms the upper surface of the low-pressure piston H, and piston-rings, as shown, are shut in between this flange and the part R. This part R forms the under side of the low-pressure piston H, and it continues downward as a hollow rod to the buffer-piston I. This hollow rod passes through two glands, S S, in the cover of the buffer-cylinder, and each of these is packed with cast-iron rings. The two glands with metallic rings and the closed chamber between them, in which an intermediate pressure exists, serve as a very effectual separation between the buffer-cylinder and the exhaust. These glands may be constructed in the manner already described in respect to the gland in the cover Q.

The rod K, which holds together all the parts of the compound piston, passes out through the top of the part M by a stuffing-box in which there is packing affording sufficient elasticity to compensate for expansion and allow the part some freedom for independent lateral movement.

The arrangements described above insure that any wear which may take place at the ends of the piston-rings is at once taken up; also, much trouble in fitting the parts of the piston together is avoided, the pressure insuring the accurate contact of the parts. The steam entering by A and pressing on the top of the hollow piston rod or ram M of the high-pressure cylinder of one of the elements of the engine passes the said ram as soon as it descends low enough to uncover the passage T, and by the passage is led into the high-pressure cylinder of another element of the triple engine, where the piston is then at the top of its stroke. The steam so entering acts efficiently on the upper side of the high-pressure piston, and the admission continues until the ram M in its upward stroke again closes the passage T. The lower parts of the high-pressure cylinders are open to the exhaust continuously by a passage, U. When the downstroke of the high-pressure piston has continued for nearly three-quarters of its course, the piston commences to uncover the passage V in the side of the cylinder B, and by this passage the steam which has already done work in the high-pressure cylinder enters the low-pressure cylinder of another element of the engine, the piston of which at that time is at the upper end of its stroke. The steam passes into the cylinder, propelling the piston therein and expanding. When the piston H in the low-pressure cylinder reaches the lower end of its stroke, a portion of the steam escapes from the cylinder by the lateral openings W in the side of the low-pressure cylinder, and so passes direct to the exhaust-passage U. Then during the movement of the low-pressure piston in an upward direction the remainder of the steam is caused to return by the passage by which it entered to the lower end of the high-pressure cylinder from which it came. The piston in this cylinder is now above the port at V, and the steam passes away to the exhaust at U. It will be seen that the surfaces between which the piston-rings are held are somewhat inclined. The object of this is to avoid any inward movement of the rings resulting from the steam-pressure upon them when passing the port V.

X is a passage with a stop-valve, as shown, by which steam can be allowed to pass from the steam-chest A to the upper part of the high-pressure cylinder B. Each of the three elements of the compound engine is provided with such a valve, and by opening these the upper ends of the high-pressure cylinders can be kept constantly charged with steam of the full boiler-pressure. The engine is thus converted for a time into a simple engine, the high-pressure cylinders with their pistons serving only as valves for the transmission of the steam to the low-pressure cylinders.

The bed Y of the engine forms a tank through which the crank-shaft F passes. This tank is kept partly full of oil and water, and in this way the main shaft and the bearings upon it are kept very efficiently lubricated. The tank Y communicates at its upper part with the chamber Z, surrounding the three buffer-cylinders, and between the tank and the chamber there is a passage, Y′, which serves to return to the tank Y so much of the oil and water as is carried up by the buffer-piston and ejected by the air-vents Z′ into the casing Z. The air-buffers as arranged not only check effectually the upward momentum of the connecting-rod and the moving parts, but they work quite silently, and no inconvenience or waste arises from the ejection of the lubricating matter from the vents Z′, which would be the case were the buffer-cylinders not inclosed within a chamber, Z, as described.

Having now particularly described and ascertained the nature of my said invention and in what manner the same is to be performed, I declare that what I claim in respect to my triple compound engines is—

1. The combination of the steam-chest, the three sets of high-pressure and low-pressure cylinders, their pistons, the piston rods or rams fixed to the pistons and constituting steam-admission valves, the main shaft, its cranks, rods by way of which the cranks have connection with the pistons of the high and low pressure cylinders, and the steam-passages leading from the high-pressure cylinders to the low-pressure cylinders, substantially as and for the purpose set forth.

2. The combination of the steam-chest, the three sets of high-pressure and low-pressure cylinders, their pistons, the piston-rods constituting valves, the cranked main shaft, the connecting-rods, the steam-passages between the high-pressure and low-pressure cylinders, and the steam passages and cocks for admitting steam continuously from the steam-chest to the high-pressure cylinders, substantially as and for the purpose set forth.

3. The arrangement of the covers of the low-pressure cylinders, the same being received into sockets at the upper ends of the cylinders, and kept in place by the casting above, of which the high-pressure cylinder forms part, substantially as described.

PETER WILLIAM WILLANS.

Witnesses:
　Geo. J. B. Franklin,
　Jno. Dean,
*Clerks to Messrs. Scorer & Harris, Notaries Public, 17 Gracechurch St., London, E. C.*